No. 628,213. Patented July 4, 1899.
A. SCHUCH.
VEHICLE WHEEL.
(Application filed May 4, 1899.)
(No Model.)
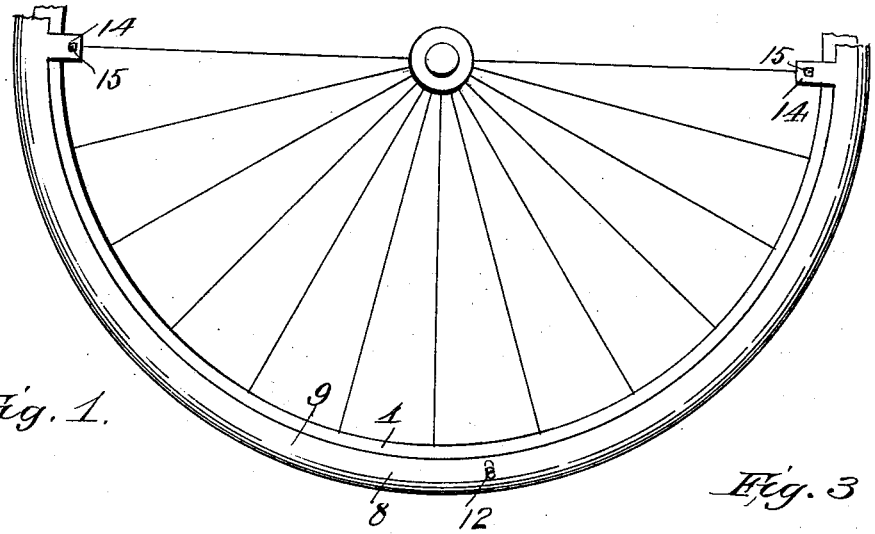
Fig. 1.
Fig. 2.
Fig. 3.
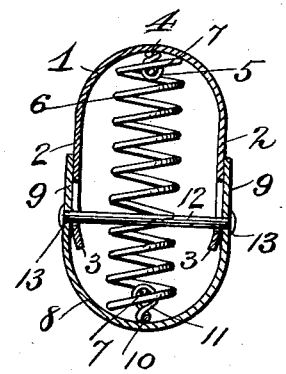
Fig. 5.
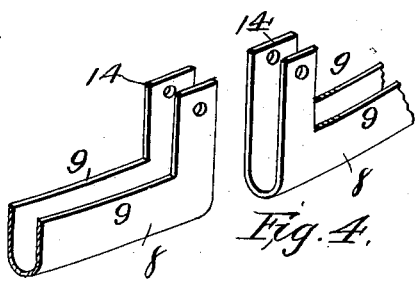
Fig. 4.
Witnesses
F. L. Ourand
Inventor
August Schuch.
by
H. B. Willson & Co
Attorneys
THE NORRIS PETERS CO., PHOTO-LITHO., WASHINGTON, D. C.

UNITED STATES PATENT OFFICE.

AUGUST SCHUCH, OF HECTOR, MINNESOTA.

VEHICLE-WHEEL.

SPECIFICATION forming part of Letters Patent No. 628,213, dated July 4, 1899.

Application filed May 4, 1899. Serial No. 715,604. (No model.)

*To all whom it may concern:*

Be it known that I, AUGUST SCHUCH, a citizen of the United States, residing at Hector, in the county of Renville and State of Minnesota, have invented certain new and useful Improvements in Vehicle-Wheels; and I do declare the following to be a full, clear, and exact description of the invention, such as will enable others skilled in the art to which it appertains to make and use the same.

My invention relates to bicycle-wheels, and more particularly to that class in which a spring device is employed to supersede the ordinary pneumatic tire; and the object is to provide the rim with an encompassing sheet-metal tire and an intervening series of radial springs to give the required degree of resiliency to the tire.

To these ends the invention consists in the construction, combination, and arrangement of the several elements of the device, as will be hereinafter more fully described, and particularly pointed out in the claims.

In the accompanying drawings the same reference characters indicate the same parts of the invention.

Figure 1 is a side elevation of a section of the tire and rim of a vehicle-wheel embodying my invention. Fig. 2 is a longitudinal section of the same. Fig. 3 is a transverse section on the line $xx$ of Fig. 2. Fig. 4 shows the manner of connecting the meeting ends of the tire. Fig. 5 is a detail perspective view of a portion of the retaining-wire and a section of the outer metal tire.

1 denotes the rim, which is U-shaped in cross-section, with its walls 2 2 preferably parallel and with their outer edges 3 3 flaring inwardly, as shown.

4 denotes a continuous retaining-wire extending around the inside of the rim and soldered or otherwise fixed to the metal at suitable intervals to retain it in place. This wire is formed with a series of integral loops or eyes 5 5, which extend into the inner ends of the radial springs 6 6, the springs being secured in place by means of a key-wire 7, which passes through the contiguous end coil of the springs 6 and the alined eyes 5 of the retaining-wire.

8 denotes the sheet-metal tire, which is also of a reverse-U shape, to encompass the rim, and its parallel walls 9 9 extend inwardly and encompass the corresponding walls of the rim.

10 denotes the retaining-wire, fixed to the inside of the tire and formed with the enlarged loops or eyes 11, which enter the outer ends of the springs 6 6.

12 12 denote lateral bolts which pass through an orifice 13 in the walls of the tire and an alined slot in the contiguous walls of the rim to retain the tire in place and to permit its movement to compensate for the resiliency of the springs.

The tire is preferably made in two sections, as shown in Fig. 4, and the meeting ends of each section are formed with integral ears 14 14, which overlap and are secured together by bolts 15, as shown.

The tire is preferably made of sheet-steel formed in shape and then tinned, nickel-plated, or oxidized to give it an attractive durable finish.

The accompanying drawings show my invention in the best form now known to me; but many changes in the details might be made within the skill of a good mechanic without departing from the spirit of my invention as set forth in the claims at the end of this specification.

Having thus fully described my invention, what I claim as new, and desire to secure by Letters Patent, is—

1. The U-shaped rim, formed with the parallel walls, the looped retaining-wire fixed to said rim, the tire formed with the parallel walls, encompassing said rim, the looped retaining-wire fixed in the tire and the spiral springs interposed between the tire and rim and having their free ends encompassing the loops on the retaining-wires, substantially as shown and described.

2. The U-shaped rim, the looped retaining-wire fixed in said rim, the tire, the looped retaining-wire fixed in said tire, the radially-arranged spiral springs, interposed between the rim and tire, and the key-wire passing through the rim-retaining wire and the contiguous encompassing ends of said springs, substantially as shown and described.

In testimony whereof I have hereunto set my hand in presence of two subscribing witnesses.

AUGUST SCHUCH.

Witnesses:
W. E. BAUMGARTEN,
FRANK F. GOBLENZ.